United States Patent
Tarr et al.

(10) Patent No.: US 6,229,576 B1
(45) Date of Patent: May 8, 2001

(54) EDITING SYSTEM WITH ROUTER FOR CONNECTION TO HDTV CIRCUITRY

(75) Inventors: Morton Tarr, Bolton; Peter Fasciano, Natick; Craig R. Frink, Chelmsford, all of MA (US)

(73) Assignee: Avid Technology, Inc., Tewskbury, MA (US)

( * ) Notice: Subject to any disclaimer, the term of this patent is extended or adjusted under 35 U.S.C. 154(b) by 0 days.

(21) Appl. No.: 09/055,048

(22) Filed: Apr. 3, 1998

(51) Int. Cl.$^7$ ................................ H04N 5/14; H04N 9/64
(52) U.S. Cl. .................... 348/575; 348/722; 345/328; 386/52
(58) Field of Search ....................... 348/576, 578, 348/580–583, 722, 552; 345/327, 328, 349, 352; 386/52, 55, 56; H04N 5/14, 9/64, 5/222

(56) References Cited

U.S. PATENT DOCUMENTS

| 5,367,341 | * 11/1994 | Schnorf ................................ 348/616 |
| 5,412,773 | 5/1995 | Carlucci et al. . |
| 5,459,585 | 10/1995 | Owashi et al. . |
| 5,491,561 | 2/1996 | Fukuda . |

(List continued on next page.)

FOREIGN PATENT DOCUMENTS

| 0 423 921 A2 | 4/1991 | (EP) . |
| 0 438 299 A2 | 7/1991 | (EP) . |
| 0 644 700 A2 | 3/1995 | (EP) . |
| 0 773 683 A2 | 5/1997 | (EP) . |

(List continued on next page.)

OTHER PUBLICATIONS

International Search Report for PCT/US9905765.
International Search Report for PCT/US9905223.
Patent Abstracts of Japan, vol. 15, No. 273, (Jul. 1991) & JP 03 091384, Abstract, Apr. 1991.
Patent Abstracts of Japan, vol. 96, No. 12, Dec. 1996 & JP 08 205082, Abstract, Aug. 1996.
Chatel, J., "Towards a world studio standard for high definition television", International Broadcasting Convention, 1988, pp. 8–11.
Schiffler, W., "HDTV–Produktionen im Eureka–Standard", Fernseh und Kinotechnik, vol. 43, No. 6, Jan. 1090, pp. 295–298.

(List continued on next page.)

Primary Examiner—Michael Lee
(74) Attorney, Agent, or Firm—Wolf, Greenfield & Sacks, P.C.

(57) ABSTRACT

A non-linear editor is connected to video processing equipment through a serial digital video interface to edit high definition (HD) television video data. The non-linear editor includes a randomly accessible, computer-readable and re-writeable storage medium that stores a plurality of sequences of HD digital images representing a frame or field of HD motion video data. The non-linear editor provides a configuration control signal to identify processing to be performed on the HD video data and defines a video program to be rendered using the stored HD digital images. An input serial digital interface and an output serial digital interface in the non-linear editor provide the HD video data to be edited. A multiformat video router controls the HD video data sent between the non-linear editor and the video processing equipment. The router is video interconnected to the video processing equipment and to the serial digital interfaces of the non-linear editor.

9 Claims, 4 Drawing Sheets

U.S. PATENT DOCUMENTS

| | | |
|---|---|---|
| 5,497,198 | 3/1996 | Kim . |
| 5,537,157 | 7/1996 | Washino et al. . |
| 5,577,042 | 11/1996 | McGraw, Sr. et al. . |
| 5,589,993 | 12/1996 | Naimpally . |
| 5,822,024 * | 10/1998 | Setogawa et al. .................. 348/845 |
| 5,861,864 | 1/1999 | Jensen . |
| 5,872,565 | 2/1999 | Greaves et al. . |
| 5,963,262 | 10/1999 | Ke et al. . |

FOREIGN PATENT DOCUMENTS

| | | |
|---|---|---|
| 0 777 383 A1 | 6/1997 | (EP) . |
| 0 835 028 A1 | 4/1998 | (EP) . |
| 2 600 479 A1 | 12/1987 | (FR) . |
| 2 287 845 | 9/1995 | (GB) . |
| 2 312 319 | 10/1997 | (GB) . |
| WO 93/21636 | 10/1993 | (WO) . |
| WO 96/26600 | 8/1996 | (WO) . |
| WO99/52113 | 10/1999 | (WO) . |

OTHER PUBLICATIONS

Ward, C. et al., "An overview of the NIST broadcast technology program", International Broadcasting Convention, Sep. 1997, pp. 147–153.

Windram, M.D., et al., "Toward high definition television", International Broadcasting Convention, 1988, pp. 1–7.

Tom Mann, Non–Linear Off–Line Editing For HDTV And Film, Dec. 1989, p. 541–546, Image Technology (Journal of the BKSTS), vol. 71, No. 12.

Bhavesh Bhatt, et al., Digital Television: Making it Work, Oct. 1997, p. 19–28, IEEE Spectrum.

Steve Wiedemann, Film Formats and HDTV: A Case For The Future–Proof Standard, printed p. 1–12, http://www.henniger.com/HDTVFILM.html.

FAQ, HDTV and Old Standards, printed Apr. 2, 1998, p. 1–14, http://web–star.com/hdtvfag.html.

Josef Scherpa, HDTV, High Definition Television Introduction, printed Apr. 2, 1998, p. 1–2, http://ece.wpi.edu./infoeng/misc/student_projects/skibum/hdintro.html.

* cited by examiner

EDITING SYSTEM WITH ROUTER FOR CONNECTION TO HDTV CIRCUITRY

FIELD OF THE INVENTION

The present invention is related to a system for editing high definition television (HDTV) resolution video data.

BACKGROUND OF THE INVENTION

Separate editing systems exist for editing standard definition television (SDTV) resolution video data and for editing HDTV-resolution video data. Currently, there is a need for a HDTV editor for manipulating digital high definition (HD) video data which can be configured from a set of editing devices such as a non-linear editor video interconnected to video processing equipment.

SUMMARY OF THE INVENTION

A non-linear editor is connected to video processing equipment through a serial digital video interface (SDI) to edit high definition television video data.

Accordingly, in one aspect a system edits HDTV-resolution video data. In the system, a non-linear editor includes a random access, computer-readable and re-writeable storage medium that stores a plurality of sequences of high definition (HD) digital still images in media files. Each image may represent a single frame, i.e., two fields, or a single field of HD video data. The non-linear editor provides a configuration control signal to define a video program to be rendered using the stored HD digital still images. The non-linear editor includes an input serial digital interface and an output serial digital interface to provide the HD video data to be edited. In the system, a multiformat video router directs the HD video data between the non-linear editor and video processing equipment. The router is connected by a video interconnect to the input serial interface and the output serial interface of the non-linear editor and the router receives the configuration control signal from the non-linear editor. The router is connected by a video interconnect to provide video data to an input of the video processing equipment, and is connected by a video interconnect to receive a video data output of the video processing equipment. In the system, video processing equipment has an input for receiving HD video data from the multiformat router, and an output for sending HD video data to the multiformat router. The video processing equipment also has an input for receiving the configuration control signal from the non-linear editor.

Another aspect is a non-linear editor which may include a plurality of HD serial digital interfaces to convert a video stream to bus data.

Another aspect is video processing equipment including at least one HD codecs for formatting the HD video data and a video effects generator for editing the HD video data.

Another aspect is a multiformat video router which includes a standard definition router and an HD router.

Another aspect is a method for storing edited HDTV-resolution video data. Edited HD video data is received from a video effects generator. The edited HD video data is compressed into an HD video data file which includes HD video data information. The compressed HD video data file is sent through a serial digital interface to a non-linear storage system.

Another aspect is a method for playing back HD video data. HD video data is retrieved from storage and transferred through a serial digital interface. The retrieved HD video data is decompressed and sent to a video effects generator for processing. The processed HD video data is provided as an output.

Another aspect is buffering the HD video data at an HD serial interface and providing the buffered HD video data to the video effects generator.

Another aspect is capturing the output of the video effects generator at an HD serial digital interface.

Another aspect is a method for editing HDTV-resolution video data. A plurality of sequences of HD digital still images is stored and a video program to be rendered using selected stored HD digital still images is defined. Devices including video processing equipment are configured for processing the selected HD still images. The selected HD still images are transferred over a video interconnection to the video processing equipment and the processed HD still images are rendered.

DETAILED DESCRIPTION

Figure 1A:
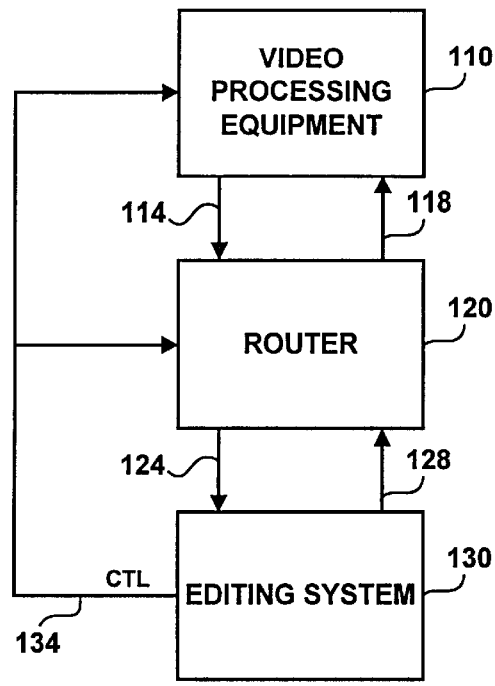
FIG. 1*a* is a block diagram of a system in one embodiment.

FIG. 1*a* is a block diagram of an example system for editing high definition (HD) video data. HD video data may include any data at a resolution higher than standard definition (SD) video data, for example, data with a resolution greater than 525 scan lines and/or at more than 30 frames/sec. The HD data may be in 8 or 10-bit components. The system includes video processing equipment 110 which processes HD video data, and a router 120 which transfers HD video data to the video processing equipment 110 from the editing system 130.

The video processing equipment 110 may be, for example, one or more coder/decoder processors (codecs), a video effects generator or display or capture device. Video processing equipment 110 may capture high definition (HD) video data for processing at input 118. Video to be played back may be output from video processing equipment 110 at output 114.

Video router 120 may be a multiformat router (e.g., a router capable of directing both standard (SD) and HD video data) which is an interface for the HD video data which travels between the video processing equipment 110 and the editing system 130 through inputs and outputs 114, 118, 124 and 128. Router 120 may also be two separate routers—one for HD video data and one for standard definition (SD) video data. Router 120 may be a cross-point switch such as the HDS-V3232 by Sony Corporation. Router 120 is configurable by the editing system 130 based on the editing to be performed.

A configuration control signal 134 may be sent by editing system 130 to router 120 and video processing equipment 110 to configure those devices according to the type of editing to be performed and the amount of HD video data to be edited.

The editing system 130 is a non-linear editor including a random-access, computer-readable and re-writeable storage medium that stores a sequence of digital still images. Each still image may represent a single frame, i.e., two fields, or a single field of motion video data. The editing system 130 may allow any particular image in the sequence of still images to be randomly accessed for playback. The images may include uncompressed video data, however, since digital data representing motion video may consume large amounts of computer memory, the digital data typically is compressed to reduce storage requirements.

Various types of compression may be used. Some kinds of compression may operate on a stream of data regardless of how the data may be divided to define an image. One kind of compression is called "intraframe" compression which involves compressing the data representing each still image independently of other still images. Commonly-used motion video compression schemes using intraframe compression include "motion-JPEG" and "I-frame only" MPEG. Intraframe compression allows purely non-linear access to any image in the sequence.

More compression can obtained for motion video sequences by using what is commonly called "interframe" compression. Interframe compression involves predicting one image using another. This kind of compression often is used in combination with intraframe compression. Several standards use interframe compression techniques, such as MPEG-1(ISO/IEC 11172-1 through 5), MPEG-2(ISO/IEC 13818-1 through 9) and H.261, an International Telecommunications Union (ITU) standard. MPEG-2, for example, compresses some images using intraframe compression (called I-frames or key frames), and other images using interframe compression techniques for example by computing predictive errors between images. The predictive errors may be computed for forward prediction (called P-frames) or bidirectional prediction (called B-frames). MPEG-2 is designed to provide broadcast quality full motion video. Interframe compression does not allow purely non-linear access to every image in the sequence, because an image may depend on either previous or following images in the sequence. The invention is not limited to a particular kind of compression and does not require compression.

There are several kinds of systems that may be used to author, process and display multimedia data. These systems may be used to modify the data, define different combinations of data, create new data and display data to a user. A variety of techniques are known in the art for implementing these kinds of systems.

Multimedia authoring, processing and playback systems typically have a data structure which represents the multimedia composition. The data structure ultimately refers to clips of source material, such as digitized video or audio, using an identifier of the source material, such as a unique identifier or a file name, and possibly a temporal range within the source material defining the clip. The identifier may be of a type that may be used with a list of equivalent data files to identify a file name for the source material. An index may be used to translate the temporal range in the source into a range of bytes within a corresponding file. This range of bytes may be used with the segment table for the file to identify segments of data that are needed and the storage units from which the data is retrieved.

Figure 1B:
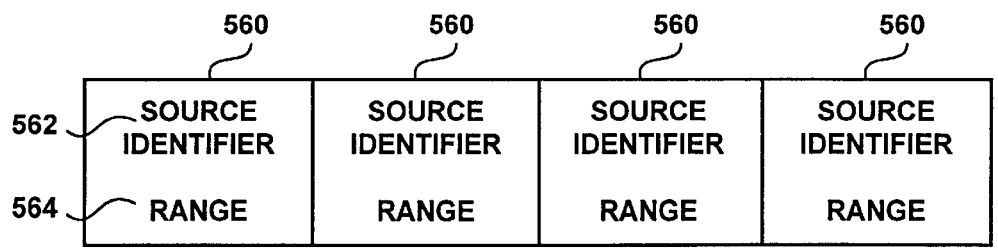
FIG. 1*b* illustrates a table for tracking equivalency of media data files.

FIG. 1*b* shows an example list structure that may be used to represent part of a multimedia composition that may be created by editing system 130. In an example shown in FIG. 1*b*, there are several clips 560, each of which includes a reference to a source identifier, indicated at 562, and a range within the source, as indicated at 564. Generally, there may be such a list for each track of media in a temporal composition. There are a variety of data structures which may be used to represent a composition. In addition to a list structure, a more complex structure is shown in PCT Published Application WO93/21636 published on Oct. 28, 1993. Other example representations of multimedia compositions include those defined by Open Media Framework Interchange Specification from Avid Technology, Inc., Advanced Authoring Format from the Multimedia Task Force, QuickTime from Apple Computer, DirectShow from Microsoft, and Bento also from Apple Computer, and as shown in PCT Publication WO96/26600.

The data structure described above and used to represent multimedia programs may use multiple types of data that are synchronized and displayed. The most common example is a television program or film production which includes motion video (often two or more streams or tracks) with associated audio (often four or more streams or tracks).

Because the video and audio data may be stored in different data files and may be combined arbitrarily, better performance may be obtained if requests for data for these different data files are managed efficiently. For example, an application may identify a stream for which data can be read, and then may determine an amount of data which should be read, if any. A process for performing this kind of management of read operations is shown in U.S. Pat. No. 5,045,940. In general, the application determines which stream has the least amount of data available for display. If there is a sufficient amount of memory data to be played back for that stream to efficiently read an amount of data, then that data is read from the file. When it is determined that data for a stream should be requested, each segment of the data is requested from a storage unit selected from those on which the segment is stored. In order to identify which files to request from the storage unit, the editing system may convert a data structure representing a composition, such as shown in FIG. 1*b*, into file names and ranges within those files.

Editing system 130 may use various audio and video media files stored on a storage system to create a composition. Editing system 130 may be capable of handling one or more tracks of audio/video information, and may be capable of performing editing functions such as dissolves, wipes, flips, flops, and other functions known in the art of video production. Media files are typically created by a digitizing system (not shown) that receives one or more audio/video inputs from a media player (not shown). These media files may also be digitized directly by a digital recorder (not shown). Editing system 130 may also use interactive elements in creating a composition.

A commercial editing system 130 may be used, such as the Media Composer video production system or NewsCutter news editing system available from Avid Technology, Inc. (NewsCutter is a registered trademark of Avid Technologies, Inc.). Also, a commercial playback system suitable for implementing the present invention may be used that implements the Media Engine video playback system available from Avid Technology, Inc. that is incorporated in the Avid AirPlay MP playback server system (AirPlay is a registered trademark of Avid Technology, Inc.). A commercial storage system (not shown) suitable for storing composition files includes the MediaShare external storage device (MediaShare is a trademark of Avid Technology, Inc.). Other commercial systems may be used.

Figure 2:
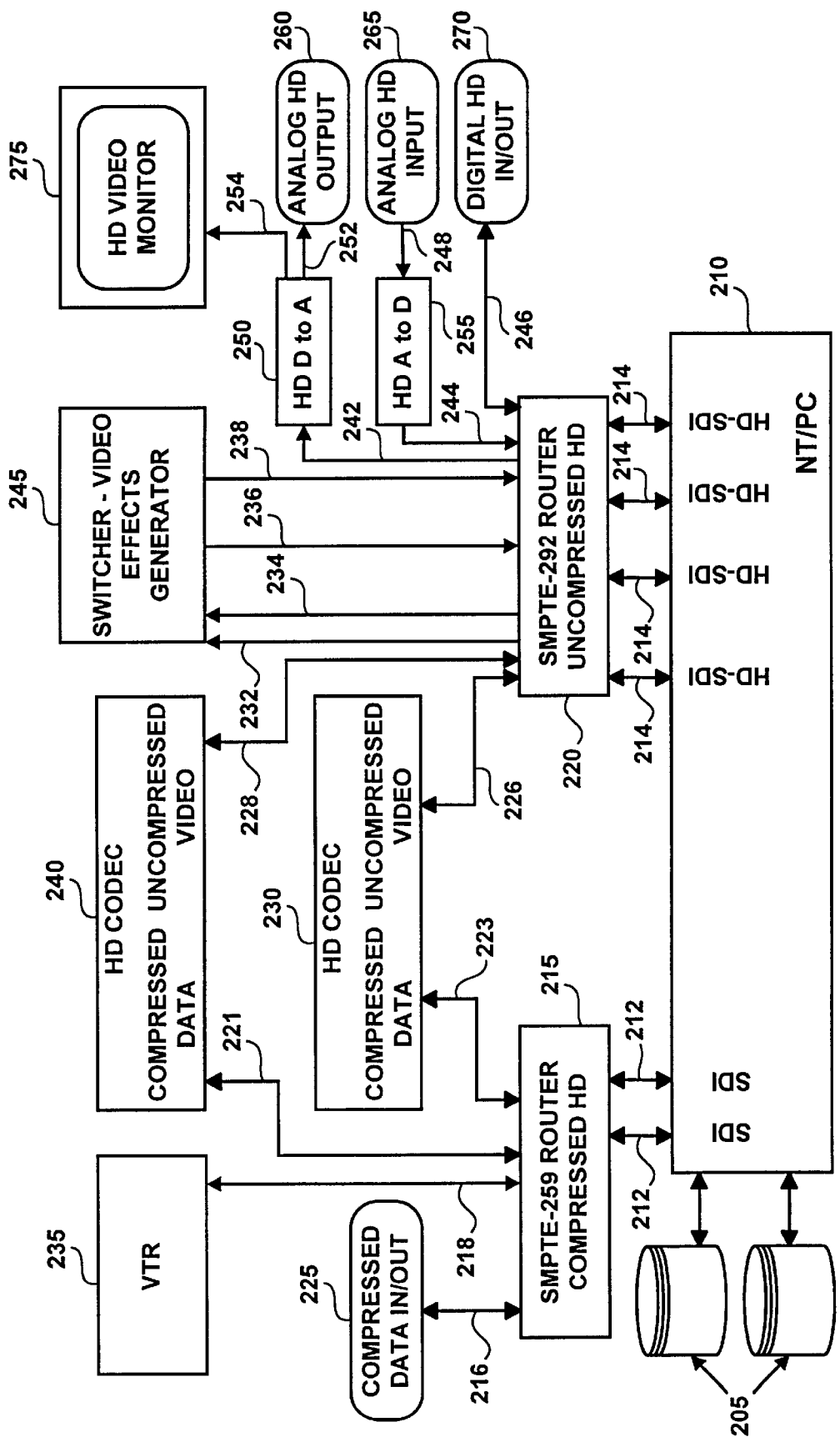
FIG. 2 is a more detailed block diagram of the system in FIG. 1.

FIG. 2 is a more detailed block diagram of a system for editing high definition video data such as the one shown in FIG. 1a. A non-linear editor is shown as computer 210 and non-linear storage system 205. In non-linear systems, the need for multiple copies of video sources to produce arbitrary sequences of segments has been avoided by the random-access nature of the media. Arbitrary sequences of segments from multiple data files are provided by pipelining and buffering non-linear accesses to the motion video data. Storage system 205 stores HD video data in compressed format as media files, although the HD video data may also be in uncompressed format. Another example of an editing system may be found in U.S. patent application entitled "HDTV EDITING AND PREVISUALIZATION USING SDTV DEVICES" by Craig R. Frink et al. filed Apr. 3, 1998.

Computer 210 includes a serial digital interface (SDI) and a high definition serial digital interface (HD-SDI). The SDI and HD-SDI interfaces provide video interconnections to router 120. The SDI cards may be, for example, the Dynamo VideoPump card by Viewgraphics, Inc, or an SDI card by Gennum. From the point of view of the non-linear editor, the SDI is a video input and output device. The SDI cards can transfer multiple streams of HD video data concurrently and in real-time to the storage system 205.

The HD-SDI cards may be any interface card which can capture an HD video stream at a rate in the range of 54 million to (480 Progressive) 148.5 million components/second (1080 interlaced), (e.g., 8 or 10 bits) and to convert the HD video stream to peripheral connection interface (PCI) type bus data. A 64 bit/33 MHZ PCI bus or a 32 bit/66 MHZ PCI may be capable of transferring HD data in real time thereby minimizing the buffer size requirements. Each of the HD-SDI cards has a buffer capable of capturing a number of high definition (HD) video frames which may later be transferred for processing or storage. The cards may be expandable to accommodate additional codec or video effects generator equipment which include more inputs and outputs of HD video data. One of ordinary skill in the art may develop an HD-SDI card based on known products by Sony and Panasonic which include both SDI and HD-SDI interfaces, from known HD products, or from technology used for SDI cards by Viewgraphics and Gennum. The SDI and HD-SDI cards provide a video interconnection between computer 210 and routers 215 and 220. The video interconnection between the SDI cards and router 215 allows compressed HD video data representing an image to be edited to be carried in packet form between the non-linear editor 210 and HD codecs 230 and 240. The video data transferred by the SDI is defined using markers signifying the Start of Active Video (SAV) and End of Active Video (EAV) to delineate a field of HD video data. The video interconnection between the HD-SDI cards and router 220 allows a continuous, uncompressed HD video data stream to be carried between the HD-SDI cards and router 220.

A computer interconnection between the interface cards and the routers may also be used instead of a video interconnection. The computer interconnection assigns an address for each device in the system and uses control information to identify a start of a frame of HD video data and a number of lines which is being sent to coordinate the transfer of the HD video data between the devices. When using a computer interconnection, the non-linear editor is responsible for identifying each device and its address in the system. However, when the video interconnection is used, the non-linear editor is responsible for providing an output HD video data stream. Therefore, the devices which receive or send the HD video data stream, as well as other devices in the system, are transparent to the non-linear editor.

Router 215 transfers compressed high definition video data between computer 210 and video processing equipment which may include video effects generator 245 and high definition codec 230 or high definition codec 240. Router 215 may be connected to an input/output port 225 for receiving and transferring compressed HD video data. Router 215 may also be connected to an external videotape recorder (VTR) 235, such as a D-5 VTR from Panasonic, to store HD video data. Router 215 may be used to transfer compressed HD data and may be, for example, a Society of Motion Picture and Television Engineers (SMPTE) standard SMPTE-259 router, such as a DVS-V1616 by Sony or a VIA 32 series router such as VIA 16×16s by Leitch. The input and the output side of router 215 may be configurable, for example, by increments of four channels.

Router 220 directs uncompressed high definition video data between computer 210 and video effects generator 245. Router 220 may be a SMPTE-292 router for transferring uncompressed HD video data. Router 220 is also connected to HD video effects generator 245 which operates on real-time video streams through input/output port 270 used for transferring digital high definition video signals to or from external equipment. Video effects generator 245 may be, for example, a product developed by Sony, Grass Valley or Abekas. Router 220 is connected to high definition digital to analog (D/A) converter 250 which provides an output to high definition video monitor 275 or to analog high definition output 260. HD video monitor may be for example, Sony's HDM2830 or Panasonic's AT-H3215W plus a digital to analog convertor such as Panasonic Model AJ-HDA500. Router 220 includes an input 244 from high definition analog to digital (A/D) converter 255 which receives an analog high definition input 265.

Both routers 215 and 220 are configurable by the non-linear editor which specifies the type of editing to be performed and the amount of HD data to be edited. The routers 215 and 220 transfer the HD video data based on the configuration control signal. The editing process switches between playback and storage of the edited HD video data (the processes are described below in connection with FIGS. 3 and 4) and the routers change their routing configuration based on a time code or a number of frames to be played back or stored as indicated by the non-linear editor during the initial configuration.

HD codecs 230 and 240 may be, for example, the Digital HD VTR Processor by Panasonic, part number AJ-HDP500P. The codecs compress and decompress the HD video data. The operation of FIG. 2 will now be described in connection with FIGS. 3 and 4.

Figure 3:
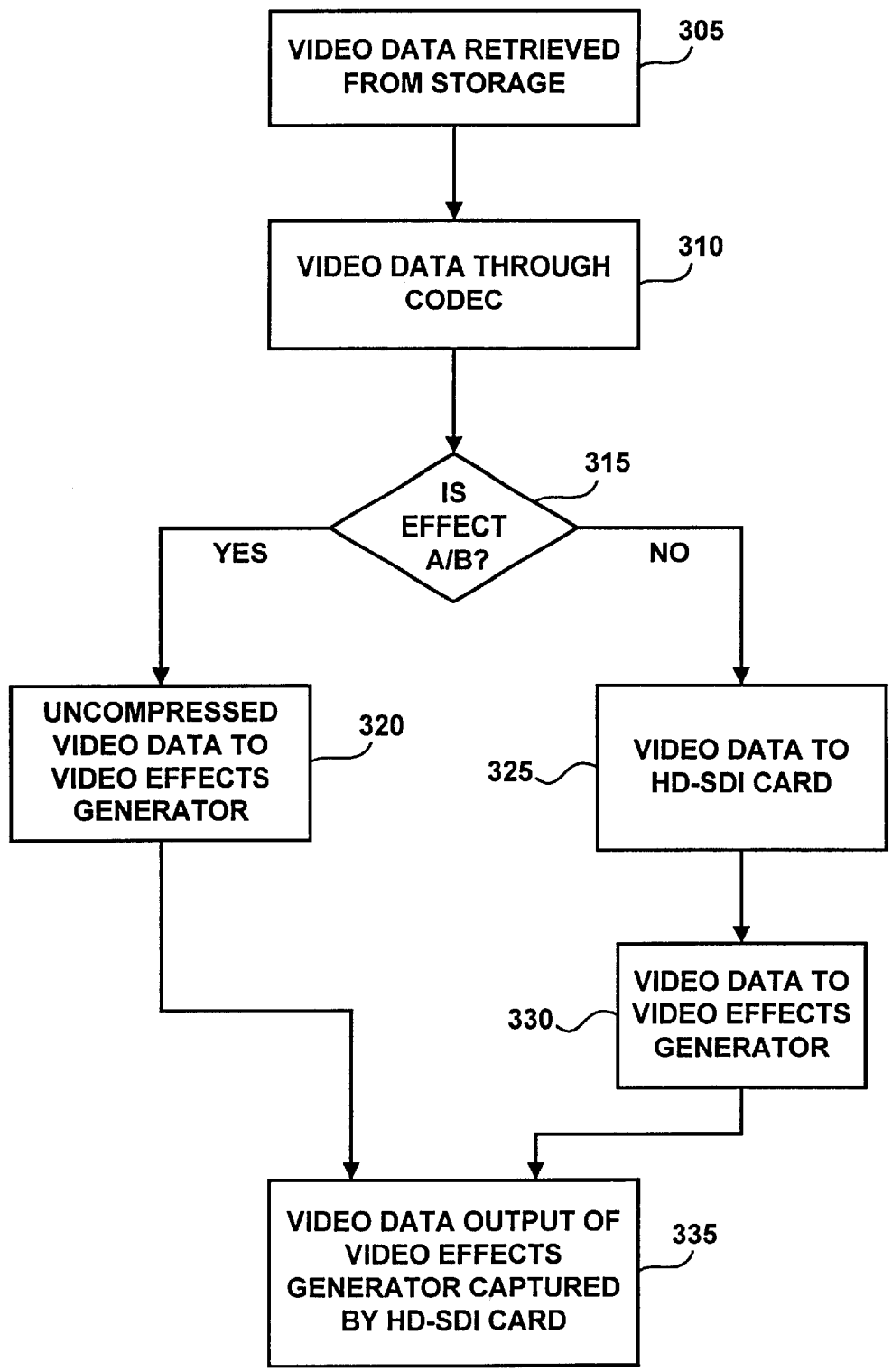
FIG. 3 is a flowchart describing how video effects are played back in the system of FIG. 2.

FIG. 3 is a flowchart of the process of editing HDTV video data and playing back the edited HD video data. By defining a sequence of clips of video data, high definition video data is retrieved by non-linear editor 210 from a storage system 205, step 305. The HD video data may be retrieved as a single field or frame of HD video data or as a linear or non-linear sequence of video clips. The storage system 205 may be non-linear and may allow random non-linear access of HD video data.

The retrieved HD video data is transferred by the SDI card to router 215 and is sent to codec 230 or codec 240, step 310. In a single stream system only codec 230 is used. Codec 230 receives the retrieved HD video data, which is in the format of a compressed data file representing the HD video image, and decompresses the HD data file to video data format.

In step 315, if the effect to be applied is determined to be an A/B effect (i.e., a wipe, fade, etc.) then the uncompressed video is sent through router 220 to video effects generator 245, step 320. If the effect is not an A/B effect, and is for example, an A/B/C effect (i.e., a ripple, page curl, etc.), the uncompressed video is sent to an HD-SDI interface card, step 325 where it is buffered while the system waits for another clip of HD video data to be used in creating the effects. After the streams of HD video data for the A/B/C effect is buffered, the HD video data is sent to the video effects generator 245 in step 330 for processing.

The HD video data output of the video effects generator 245 which includes the added effects is captured by the HD-SDI card in the non-linear editor 210. The non-linear editor 210 may also be used to edit the HD video data. The HD video data output of the video effects generator 245 may be sent to HD video monitor 275 or it may be transferred as an analog 260 or digital 270 HD output. The process of storing the generated HD video is described below.

Figure 4:
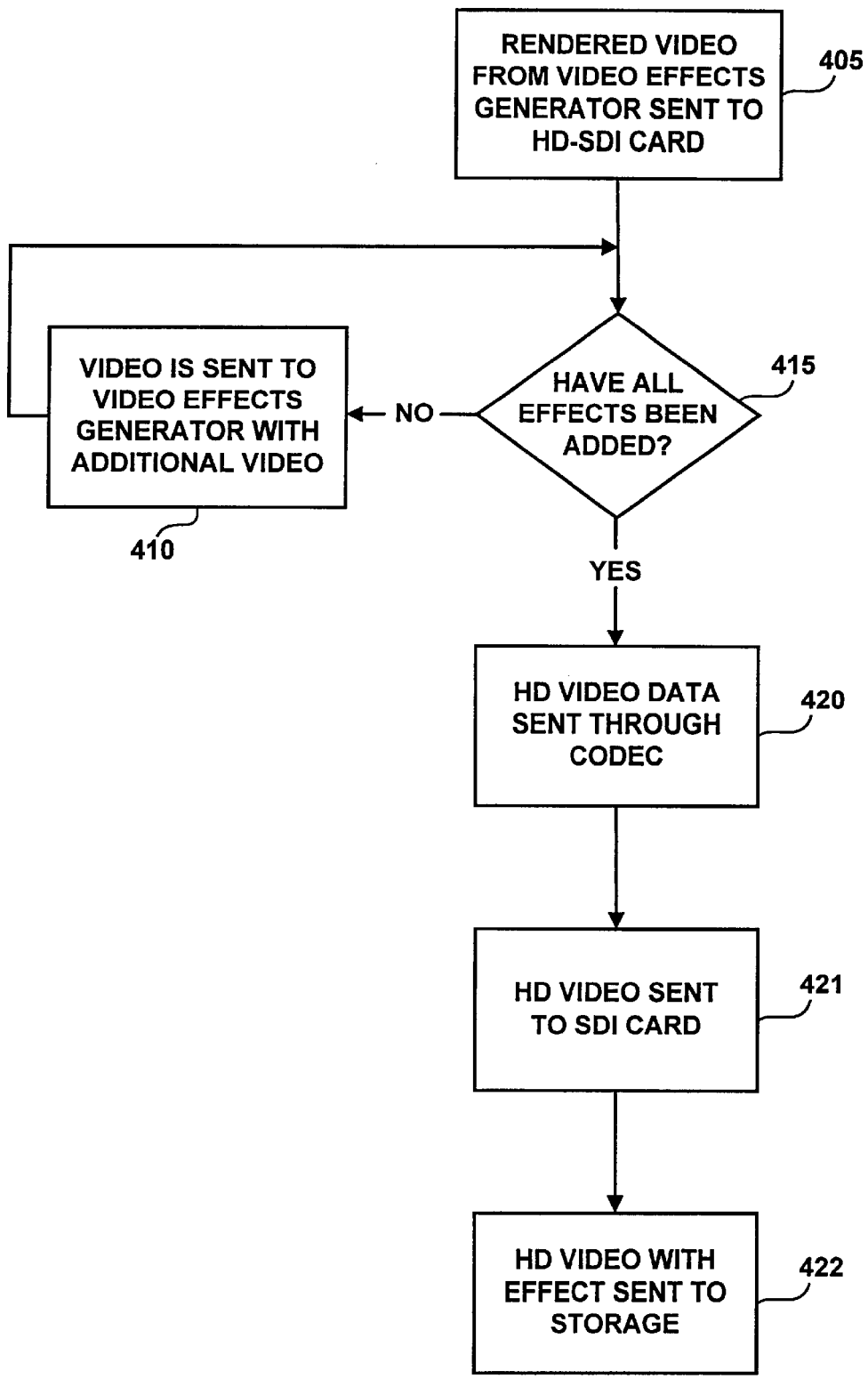
FIG. 4 is a flowchart describing how video with video effects is stored in the system of FIG. 2.

FIG. 4 is a flowchart of the process of storing an output of the video effects generator 245 to disk. In step 405, the rendered video from the video effects generator 245 is sent to the HD-SDI card where it is buffered.

If there are more effects to be added in step 415, then additional video is sent to the video effects generator 245 with the rendered video to allow more complex editing, in step 410. After all of the desired effects have been added to the HD video data in step 415, the HD video data is sent through a codec, such as codec 230 in step 420 where the HD video data with the effect is transformed to a compressed format. In step 421, the compressed HD video data is next transferred to an SDI card in the non-linear editor 210. The edited HD video data is transferred to storage system 205 in step 422. A composition which has been edited and stored according to the process in FIG. 4 can be played back using the process in FIG. 3, such that the data file including the edits is played back, rather than separate sources of HD video data.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for editing high definition television resolution video data comprising:

a non-linear editor including a random-access, computer-readable and re-writeable storage medium that stores a plurality of sequences of digital still images representing high definition video data in media files, wherein the non-linear editor provides a configuration control signal that defines a video program to be edited using the stored high definition digital still images, and wherein the non-linear editor includes a input serial digital interface and an output serial digital interface to provide the high definition video data to be edited;

a multiformat video router for directing the high definition video data between the non-linear editor and a video processing equipment, wherein the router is connected by a video interconnect to the input serial interface and the output serial interface of the non-linear editor, wherein the router receives the configuration control signal from the non-linear editor to initialize the configuration of the router, wherein the router is connected by a video interconnect to provide video data to the video processing equipment, and wherein the router is connected by a video interconnect to receive video data from of the video processing equipment; and wherein the video processing equipment has an input for receiving high definition video data to be edited from the multiformat router and an output for sending edited high definition video data to the multiformat router, and has an input for receiving the configuration control signal from the non-linear editor to determine processing to be performed on the received high definition video data.

2. The system of claim 1, wherein the non-linear editor further includes at least one input high definition serial digital interface and at least one output high definition serial digital interface.

3. The system of claim 1, wherein the image data represents a single frame of motion high definition video data.

4. The system of claim 1, wherein the image data represents a single field of motion high definition video data.

5. The system of claim 1, wherein the image is uncompressed video data.

6. The system of claim 1, wherein the image is compressed video data.

7. The system of claim 1, wherein the video processing equipment includes at least one high definition coder/decoders for formatting the high definition video data and a video effects generator for editing the high definition video data.

8. The system of claim 1, wherein the multiformat router includes a standard definition router and an high definition router.

9. The system of claim 1, wherein the output of the video processing equipment is transferred to an high definition video monitor.

* * * * *